(12) United States Patent
Gao et al.

(10) Patent No.: US 8,034,885 B2
(45) Date of Patent: Oct. 11, 2011

(54) FREE-RADICAL POLYMERIZATION PROCESS PRODUCING AQUEOUS POLYMER DISPERSION WITH LOW RESIDUAL MONOMER CONTENT UTILIZING OIL AND WATER SOLUBLE INITIATORS

(75) Inventors: Jun Gao, Mannheim (DE); Xiang-Ming Kong, Mainz (DE); Klaus-Dieter Hungenberg, Birkenau (DE); Juergen Schmidt-Thuemmes, Neuhofen (DE)

(73) Assignee: BASF SE, Ludwigshafen (DE)

( * ) Notice: Subject to any disclaimer, the term of this patent is extended or adjusted under 35 U.S.C. 154(b) by 1158 days.

(21) Appl. No.: 10/566,248

(22) PCT Filed: Jul. 8, 2004

(86) PCT No.: PCT/EP2004/007470
§ 371 (c)(1),
(2), (4) Date: May 26, 2006

(87) PCT Pub. No.: WO2005/016977
PCT Pub. Date: Feb. 24, 2005

(65) Prior Publication Data
US 2007/0060702 A1 Mar. 15, 2007

(30) Foreign Application Priority Data
Aug. 4, 2003 (DE) .................................. 103 35 958

(51) Int. Cl.
*C08F 2/00* (2006.01)
*C08F 2/16* (2006.01)
*C08G 85/00* (2006.01)

(52) U.S. Cl. ............. 526/73; 526/61; 526/78; 526/79; 526/80; 526/86; 526/87; 524/700; 524/800

(58) Field of Classification Search .................. 260/29.7; 521/56
See application file for complete search history.

(56) References Cited

U.S. PATENT DOCUMENTS

| | | | | |
|---|---|---|---|---|
| 3,920,624 A * | 11/1975 | Humkey et al. | | 528/501 |
| 3,951,925 A * | 4/1976 | Mishima et al. | | 526/73 |
| 4,003,871 A * | 1/1977 | Costanza et al. | | 524/836 |
| 4,085,267 A * | 4/1978 | Morningstar et al. | | 526/74 |
| 4,243,562 A * | 1/1981 | Petit | | 524/733 |
| 4,529,753 A | 7/1985 | Taylor | | |
| 4,739,008 A * | 4/1988 | Robinson et al. | | 524/801 |
| 5,087,676 A | 2/1992 | Hieder et al. | | |
| 5,401,582 A | 3/1995 | Weyland et al. | | |
| 5,869,577 A * | 2/1999 | Aihara et al. | | 525/276 |
| 5,908,872 A * | 6/1999 | Gluck et al. | | 521/146 |
| 5,994,457 A | 11/1999 | Stanger et al. | | |
| 6,365,709 B1 | 4/2002 | Heibel et al. | | |
| 6,433,132 B1 | 8/2002 | Wood et al. | | |
| 2003/0153710 A1 * | 8/2003 | Shin et al. | | 526/328.5 |

FOREIGN PATENT DOCUMENTS

| | | |
|---|---|---|
| DE | 37 18 520 | 12/1988 |
| DE | 38 34 734 | 4/1990 |
| DE | 40 03 422 | 8/1991 |
| DE | 42 32 194 | 3/1994 |
| DE | 195 29 599 | 2/1997 |
| DE | 198 39 199 | 3/2000 |
| DE | 198 40 586 | 3/2000 |
| EP | 0 003 957 | 9/1982 |
| EP | 0 028 348 | 9/1987 |
| EP | 0 563 726 | 7/1996 |
| EP | 0 764 699 | 3/1997 |
| EP | 0 767 180 | 4/1997 |
| WO | 95/33775 | 12/1995 |
| WO | 00/22003 | 4/2000 |
| WO | 02/00742 | 1/2002 |
| WO | 03/040192 | 5/2003 |

OTHER PUBLICATIONS

Handbook of Reagents for Organic Synthesis: Activating Agents and Protecting Groups by Pearson and Roush, John Wiley and Sons, 1999 pp. 35-36.*
Dupont: AIBN (Vazo 64®) MSDS; no author given; Apr. 18, 2006.*
Mallinckrodt/J.T. Baker: Ammonium Persulfate MSDS; no author given; Jan. 11, 2008.*
U.S. Appl. No. 08/011,099, filed Jan. 29, 1993, Weyland, et al.
U.S. Appl. No. 07/651,602, filed Feb. 5, 1991, Weyland, et al.
U.S. Appl. No. 09/011,071, filed Feb. 11, 1998, Dobbelaar.
"Encyclopedia of Polymer Science and Engineering", vol. 8, pp. 647-677, 1987.
Blackley, D.C., "High Polymer Latices", vol. 1, pp. 3-65, 1966.
Warson, H., "The Applications of Synthetic Resin Emulsion", pp. 246-278, vol. 5, 1972.
Dieterich Dieter, Chemie in unserer Zeit 24, pp. 135-142, 1990.

* cited by examiner

*Primary Examiner* — Mark Eashoo
*Assistant Examiner* — Michael Salvitti
(74) *Attorney, Agent, or Firm* — Oblon, Spivak, McClelland, Maier & Neustadt, L.L.P.

(57) ABSTRACT

The present invention provides a novel one-step process for preparing an aqueous polymer dispersion by the free radical aqueous emulsion polymerization comprising mixing at least water, a dispersant, and an oil-soluble initiator; raising a temperature from the starting to the end reaction temperature while metering at least ethylenically unsaturated monomers and a water-soluble initiator into a reaction vessel, conducting polymerization of the monomers in the presence of the water-soluble initiator at a temperature up to the end reaction temperature, and when the temperature has reached the end reaction temperature, conducting polymerization by the oil-soluble initiator. The oil-soluble initiator is inactive at the starting reaction temperature and becomes more active as a temperature approaches the end reaction temperature at which the oil-soluble initiator is fully active.

18 Claims, No Drawings

FREE-RADICAL POLYMERIZATION PROCESS PRODUCING AQUEOUS POLYMER DISPERSION WITH LOW RESIDUAL MONOMER CONTENT UTILIZING OIL AND WATER SOLUBLE INITIATORS

BACKGROUND OF THE INVENTION

1. Field of the Invention

The present invention relates to a process for the preparation of an aqueous polymer dispersion by free radical aqueous emulsion polymerization of at least one ethylenically unsaturated compound (monomer) in the presence of at least one dispersant.

The present invention also relates to the aqueous polymer dispersions obtainable by the novel process, the use thereof as binders in adhesives, sealing compounds, plastics renders, paper coating slips and surface coating materials and for modifying mineral binders.

2. Description of the Related Art

Aqueous polymer dispersions (latices) are generally known. They are fluid systems which comprise polymer coils consisting of a plurality of entangled polymer chains (i.e. polymer particles) as the disperse phase in an aqueous dispersing medium. The weight average diameter of the polymer particles is frequently from 10 to 5,000 nm.

As in the case of polymer solutions on evaporation of the solvent, aqueous polymer dispersions, on evaporation of the aqueous dispersing medium, have the potential for forming polymer films and are therefore used in particular as binders. Owing to their environmentally friendly properties, they are becoming increasingly important.

The preparation of aqueous polymer dispersions is frequently carried out by free radical aqueous emulsion polymerization [cf. for example Encyclopedia of Polymer Science and Engineering, Vol. 8, page 659 et seq. (1987); D. C. Blackley, in High Polymer Latices, Vol. 1, page 35 et seq. (1966); H. Warson, The Applications of Synthetic Resin Emulsions, page 246 et seq., Chapter 5 (1972); D. Diederich, Chemie in unserer Zeit, 24, (1990), 135 to 142; Emulsion Polymerisation, Interscience Publishers, New York (1965); DE-A 40 03 422, and Dispersionen synthetischer Hochpolymerer, F. Holscher, Springer-Verlag, Berlin 1969]. A characteristic of this process is that water-soluble free radical initiators are used as polymerization catalysts.

For reasons relating to apparatus, the free radical aqueous emulsion polymerization is frequently carried out at below 100°. Since the polymerization rates [corresponding to the instantaneous monomer conversion rate] decrease sharply with decreasing monomer concentration and, on the other hand, the operation times of the polymerization reactors, which for reaction safety reasons are equipped with expensive instrumentation, are to be minimized, the polymerization reaction in the polymerization vessel is frequently carried out only to a monomer conversion of ≧95% by weight. The conversion of the remaining monomers is then effected in a downstream polymerization step in a separate reactor generally equipped with less expensive instrumentation. As a rule, this postpolymerization is carried out using a free radical initiator or free radical initiator system optimized for these purposes. Examples of free radical initiators which are particularly suitable for the postpolymerization or reduction of residual monomer contents are to be found in EP-B 003 957, EP-B 028 348, EP-B 563 726, EP-A 764 699, U.S. Pat. No. 4,529,753, DE-A 37 18 520, DE-A 38 34 734, DE-A 42 32 194, DE-A 195 29 599, WO 95/33775, EP-A 767 180, DE-A 19839199 or DE-A 19840586.

In addition, WO 00/22003 discloses a one-stage process for the preparation of aqueous polymer dispersions having a low residual monomer content, in which process the polymerization reaction is initiated by a redox initiator system and the polymerization temperature is specified by a defined temperature profile. A disadvantage of this process is that, in addition to the oxidizing agent acting as a free radical initiator, it is essential for a reducing agent to be present, by means of which the polymerization temperature can be reduced but through which additional foreign components also enter the aqueous polymer dispersions, which foreign components generally cannot be removed from the aqueous polymer dispersion even by subsequent stripping with inert gas or with steam.

Against the background of the prior art, it is an object of the present invention to provide a further one-stage process for the preparation of aqueous polymer dispersions having a low residual monomer content, which process, however, manages without additional reducing agents.

SUMMARY OF THE INVENTION

The present invention relates to a process for the preparation of an aqueous polymer dispersion by free radical aqueous emulsion polymerization of at least one ethylenically unsaturated compound (monomer) in the presence of at least one dispersant, wherein
  a) in a reaction vessel at a temperature which is less than or equal to the starting reaction temperature $T_S$,
    $a_1$) at least one portion of demineralized water,
    $a_2$) at least one portion of at least one oil-soluble free radical initiator,
    $a_3$) at least one portion of at least one dispersant,
    $a_4$) optionally, a portion of the at least one monomer and
    $a_5$) optionally, a portion of at least one water-soluble free radical initiator are initially taken, thereafter
  b) the reaction mixture obtained is, optionally, heated to the starting reaction temperature $T_S$, thereafter
  c) the following are metered into the reaction mixture:
    $c_1$) optionally, the remaining amount of demineralized water,
    $c_2$) optionally, the remaining amount of the at least one oil-soluble free radical initiator,
    $c_3$) optionally, the remaining amount of the at least one dispersant,
    $c_4$) the total amount or optionally, the remaining amount of the at least one monomer and
    $c_5$) the main amount of the at least one water-soluble free radical initiator, and
  d) the reaction mixture is heated to an end reaction temperature $T_E$ during the metering of the at least one monomer.

DETAILED DESCRIPTION OF THE INVENTION

We have found that this object is achieved by the process defined at the outset. For the preparation of the aqueous polymer dispersions, ethylenically unsaturated compounds which can be subjected to free radical polymerization in a simple manner, for example ethylene, vinylaromatic monomers, such as styrene, .alpha.-methylstyrene, o-chlorostyrene or vinyltoluenes, vinyl halides, such as vinyl chloride or vinylidene chloride, esters of vinyl alcohol and monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids, preferably of 3 to 6 carbon atoms, in particular acrylic acid, methacrylic acid, maleic acid, fumaric acid and itaconic acid, with alkanols of in general 1 to 12, preferably 1 to 8, in particular 1 to 4, carbon atoms, in particular methyl, ethyl, n-butyl, isobutyl, pentyl, hexyl, heptyl, octyl, nonyl, decyl and 2-ethylhexyl acrylate and methacrylate, dimethyl or di-n-butyl fumarate and maleate, nitriles of α,β-monoethylenically unsaturated carboxylic acids, such as acrylonitrile, methacrylonitrile, fumaronitrile, maleonitrile, and conjugated $C_{4-8}$-dienes, such as 1,3-butadiene (butadiene) and isoprene, are particularly suitable as at least one monomer. Said monomers are as a rule the main monomers, which together account for more than 50, preferably more than 80, % by weight, based on the total amount of monomers. As a rule, these monomers have only moderate to low solubility in water under standard conditions [20° C., 1 bar (absolute)].

Monomers which have high water solubility under the abovementioned conditions are those which comprise at least one acid group and/or the corresponding anion thereof or at least one amino, amido, ureido or N-heterocyclic group and/or the ammonium derivatives thereof which are protonated or alkylated on the nitrogen. Examples are α,β-monoethylenically unsaturated mono- and dicarboxylic acids of 3 to 6 carbon atoms and the amides thereof, e.g. acrylic acid, methacrylic acid, maleic acid, fumaric acid, itaconic acid, acrylamide and methacrylamide, and furthermore vinylsulfonic acid, 2-acrylamido-2-methylpropanesulfonic acid, styrenesulfonic acid and the water-soluble salts thereof and N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. Usually, the abovementioned monomers are present only as modified monomers in amounts of less than 10, preferably less than 5, % by weight, based on the total amount of monomers.

Monomers which usually increase the internal strength of the films of the polymer matrix usually have at least one epoxy, hydroxyl, N-methylol or carbonyl group, or at least two nonconjugated ethylenically unsaturated double bonds. Examples of these are monomers having two vinyl radicals, monomers having two vinylidene radicals and monomers having two alkenyl radicals. Particularly advantageous are the diesters of dihydric alcohols with α,β-monoethylenically unsaturated monocarboxylic acids, among which acrylic and methacrylic acid are preferred. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Also of particular importance in this context are the $C_1$-$C_8$-hydroxyalkyl methacrylates and acrylates, such as n-hydroxyethyl, n-hydroxypropyl or n-hydroxybutyl acrylate and methacrylate, and compounds such as diacetoneacryamide and acetylacetoxyethyl acrylate and methacrylate. Frequently, the abovementioned monomers are used in amounts of up to 10, preferably less than 5, % by weight, based in each case on the total amount of monomers.

Aqueous polymer dispersions which can be particularly advantageously prepared according to the invention are those whose polymers comprise

| | |
|---|---|
| from 50 to 99.9% by weight | of esters of acrylic and/or methacrylic acid with alkanols of 1 to 12 carbon atoms and/or styrene, or |
| from 50 to 99.9% by weight | of styrene and/or butadiene, or |
| from 50 to 99.9% by weight | of vinyl chloride and/or vinylidene chloride, or |
| from 40 to 99.9% by weight | of vinyl acetate, vinyl propionate and/or ethylene | incorporated in the form of polymerized units.

Aqueous polymer dispersions which in particular can be prepared according to the invention are those whose polymers comprise

| | |
|---|---|
| from 0.1 to 5% by weight | of at least one α,β-monoethylenically unsaturated mono- and/or dicarboxylic acid of 3 to 6 carbon atoms and/or the amide thereof and |
| from 50 to 99.9% by weight | of at least one ester of acrylic and/or methacrylic acid with alkanols of 1 to 12 carbon atoms and/or styrene, or |
| from 0.1 to 5% by weight | of at least one α,β-monoethylenically unsaturated mono- and/or dicarboxylic acid of 3 to 6 carbon atoms and/or the amides thereof and |
| from 50 to 99.9% by weight | of styrene and/or butadiene, or |
| from 0.1 to 5% by weight | of at least one α,β-monoethylenically unsaturated mono- and/or dicarboxylic acid of 3 to 6 carbon atoms and/or the amide thereof and |
| from 50 to 99.9% by weight | of vinyl chloride and/or vinylidene chloride, or |
| from 0.1 to 5% by weight | of at least one α,β-monoethylenically unsaturated mono- and/or dicarboxylic acid of 3 to 6 carbon atoms and/or the amide thereof and |
| from 40 to 99.9% by weight | of vinyl acetate, vinyl propionate and/or ethylene | incorporated in the form of polymerized units.

Dispersants which keep both the monomer droplets and polymer particles dispersed in the aqueous phase and thus ensure the stability of the aqueous polymer dispersion produced are concomitantly used in the novel process. Suitable such dispersants are both the protective colloids usually used for carrying out free radical aqueous emulsion polymerizations and emulsifiers.

Suitable protective colloids are, for example, polyvinyl alcohols, cellulose derivatives or vinylpyrrolidone-comprising copolymers. A detailed description of further suitable protective colloids is to be found in Houben-Weyl, Methoden der organischen Chemie, Volume XIV/1, Makromolekulare Stoffe, pages 411 to 420, Georg-Thieme-Verlag, Stuttgart, 1961.

Mixtures of emulsifiers and/or protective colloids can of course also be used. Emulsifiers whose relative molecular weights, in contrast to the protective colloids, are usually below 1,000 are frequently exclusively used as dispersants. They may be anionic, cationic or nonionic. Where mixtures of surface-active substances are used, the individual components must of course be compatible with one another, which in case of doubt can be checked by means of a few preliminary experiments. In general, anionic emulsifiers are compatible with one another and with nonionic emulsifiers. The same also applies to cationic emulsifiers, whereas anionic and cationic emulsifiers are generally not compatible with one another.

Customary emulsifiers are, for example, ethoxylated mono-, di- and trialkylphenols (degree of ethoxylation: from 3 to 50, alkyl radical: $C_4$ to $C_{12}$), ethoxylated fatty alcohols (degree of ethoxylation: from 3 to 50; alkyl radical: $C_8$ to $C_{36}$) and alkali metal and ammonium salts of alkylsulfates (alkyl radical: $C_8$ to $C_{12}$), of sulfuric monoesters of ethoxylated alkanols (degree of ethoxylation: from 4 to 30, alkyl radical: $C_{12}$ to $C_{18}$) and of ethoxylated alkylphenols (degree of ethoxylation: from 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers are to be found in Houben-Weyl, Methoden der organischen Chemie, Volume XIV/1, Makromolekulare Stoffe, pages 192 to 208, Georg-Thieme-Verlag, Stuttgart, 1961.

Compounds of the Formula I

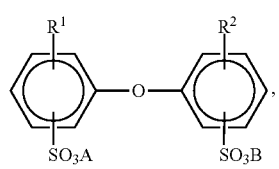

where $R^1$ and $R^2$ are $C_4$- to $C_{24}$-alkyl and one of the radicals $R^1$ or $R^2$ may also be hydrogen, and A and B may be alkali metal ions and/or ammonium ions, have furthermore proven to be surface-active substances. In the formula I, $R^1$ and $R^2$ are preferably linear or branched alkyl radicals of 6 to 18, in particular 6, 12 or 16, carbon atoms or H atoms, $R^1$ and $R^2$ not both simultaneously being H atoms. A and B are preferably sodium, potassium or ammonium ions, sodium ions being particularly preferred. Compounds I in which A and B are sodium ions, $R^1$ is a branched alkyl radical of 12 carbon atoms and $R^2$ is an H atom or $R^1$ are particularly preferred. Industrial mixtures which contain from 50 to 90% by weight of monoalkylated product, for example DOWFAX® 2A1 (brand of Dow Chemical Company), are frequently used.

The compounds I are generally known, for example from U.S. Pat. No. 4,269,749, and are commercially available.

Nonionic and/or anionic emulsifiers are preferably used for the novel process. However, cationic emulsifiers may also be used.

As a rule, the amount of dispersant used is from 0.1 to 5, preferably from 1 to 3, % by weight, based in each case on the total amount of the monomers to be subjected to the free radical polymerization (total amount of monomers).

Characteristic for the novel process is that both water-soluble and oil-soluble free radical initiators are used. Water-soluble free radical initiators are as a rule understood as meaning all those free radical initiators which are usually used in free radical aqueous emulsion polymerization, while oil-soluble free radical initiators are understood as meaning all those free radical initiators which a person skilled in the art usually uses in free radical solution polymerization. In this document, water-soluble free radical initiators are understood as meaning all those free radical initiators which have a solubility of ≧1% by weight at 20° C. and atmospheric pressure in demineralized water, while oil-soluble free radical initiators are understood as meaning all those free radical initiators which have a solubility of <1% by weight under the abovementioned conditions. Frequently, water-soluble free radical initiators have a water solubility of ≧2, ≧5 or ≧10% by weight under the abovementioned conditions, while oil-soluble free radical initiators frequently have a water solubility of ≦0.9, ≦0.8, ≦0.7, ≦0.6, ≦0.5, ≦0.4, ≦0.3, ≦0.2 or ≦0.1% by weight.

The water-soluble free radical initiators may be, for example, both peroxides and azo compounds. Peroxides which may be used are in principle inorganic peroxides, such as hydrogen peroxide, or peroxodisulfates, such as the mono- or di-alkali metal or ammonium salts of peroxodisulfuric acid, for example the mono- and disodium, mono- and dipotassium or ammonium salts, or organic hydroperoxides, such as alkyl hydroperoxides, for example tert-butyl, p-menthyl or cumyl hydroperoxide. Azo compounds used are substantially 2,2'-azobisisobutyronitrile and 2,2'-azobis(amidinopropyl) dihydrochloride (AIBA, corresponds to V-50 from Wako Chemicals).

A mono- or di-alkali metal or ammonium salt of peroxo-disulfuric acid, for example dipotassium peroxydisulfate, disodium peroxydisulfate or diammonium peroxydisulfate, is preferably used as the water-soluble free radical initiator. Of course, it is also possible to use mixtures of the abovementioned water-soluble free radical initiators.

The total amount of water-soluble free radical initiator used is from 0.01 to 5, frequently from 0.5 to 3, often from 1 to 2, % by weight, based in each case on the total amount of monomers.

What is essential to the process is that the at least one water-soluble free radical initiator is selected so that it is capable of initiating a free radical polymerization reaction of the at least one monomer at the starting reaction temperature $T_S$.

Examples of oil-soluble free radical initiators are dialkyl and diaryl peroxides, such as di-tert-amyl peroxide, dicumyl peroxide, bis(tert-butylperoxyisopropyl)benzene, 2,5-bis(tert-butylperoxy)-2,5-dimethylhexane, tert-butyl cumyl peroxide, 2,5-bis(tert-butylperoxy)-2,5-dimethyl-3-hexene, 1,1-bis(tert-butylperoxy)-3,3,5-trimethylcyclohexane, 1,1-bis(tert-butylperoxy)cyclohexane, 2,2-bis(tert-butylperoxy) butane or di-tert-butyl peroxide, aliphatic and aromatic peroxyesters, such as cumyl peroxyneodecanoate, 2,4,4-trimethylpentyl 2-peroxyneodecanoate, tert-amyl peroxyneodecanoate, tert-butyl peroxyneodecanoate, tert-amyl peroxypivalate, tert-butyl peroxypivalate, tert-amyl peroxy-2-ethylhexanoate, tert-butyl peroxy-2-ethylhexanoate, tert-butyl peroxydiethylacetate, 1,4-bis(tert-butylperoxy) cyclohexane, tert-butyl peroxyisobutanoate, tert-butyl peroxy-3,5,5-trimethylhexanoate, tert-butyl peroxyacetate, tert-amyl peroxybenzoate or tert-butyl peroxybenzoate, dialkanoyl and dibenzoyl peroxides, such as diisobutanoyl peroxide, bis(3,5,5-trimethylhexanoyl) peroxide, dilauroyl peroxide, didecanoyl peroxide, 2,5-bis(2-ethylhexanoylperoxy)-2,5-dimethylhexane or dibenzoyl peroxide, and peroxycarbonates, such as bis(4-tert-butylcyclohexyl) peroxydicarbonate, bis(2-ethylhexyl) peroxydicarbonate, di-tert-butyl peroxydicarbonate, diacetyl peroxydicarbonate, dimyristyl peroxydicarbonate, tert-butyl peroxyisopropylcarbonate or tert-butyl peroxy-2-ethylhexylcarbonate.

A compound selected from the group consisting of tert-butyl peroxy-2-ethylhexanoate (TRIGONOX® 21), tert-amyl peroxy-2-ethylhexanoate, tert-butyl peroxybenzoate (TRIGONOX® C), tert-amyl peroxybenzoate, tert-butyl peroxyacetate, tert-butyl peroxy-3,5,5-trimethylhexanoate (TRIGONOX® 42 S), tert-butyl peroxyisobutanoate, tert-butyl peroxydiethylacetate, tert-butyl peroxypivalate, tert-butyl peroxyisopropylcarbonate, (TRIGONOX® BPIC) and tert-butyl peroxy-2-ethylhexylcarbonate (TRIGONOX® 117) is preferably used as at least one oil-soluble free radical initiator. It is of course also possible to use mixtures of the abovementioned oil-soluble free radical initiators.

The total amount of oil-soluble free radical initiator used is from 0.01 to 5, frequently from 0.5 to 3, often from 1 to 2, % by weight, based in each case on the total amount of monomers.

The oil-soluble free radical initiator is advantageously chosen so that it has a half-life of $\geq 10$, frequently $\geq 12$, often $\geq 15$, hours at the starting reaction temperature $T_S$ and a half-life of $\geq 5$, frequently $\leq 3$, hours, often $\leq 1$ hour, at the end reaction temperature $T_E$. The corresponding half-lives are familiar to a person skilled in the art or can be determined by him in simple experiments. Corresponding reference works are also available, for example J. Brandrup, E. H. Immergut and E. A. Grulke, Polymer Handbook, 4th edition, Chapter II, pages 1 to 76, J. Wiley & Sons, New York.

It is essential to the process that at least one portion of demineralized water, at least one portion of at least one oil-soluble free radical initiator, at least one portion of at least one dispersant, if required a portion of the at least one monomer and, optionally, a portion of at least one water-soluble free radical initiator are initially taken in a reaction vessel at a temperature which is less than or equal to the starting reaction temperature $T_S$, frequently at from 20 to 25° C. (room temperature).

At least a portion of the demineralized water is initially taken in the reaction vessel. However, it is also possible initially to take the total amount of the water in the reaction vessel. If only a portion of the water is initially taken, the remaining amount of the water can be added to the reaction medium during the metering phase, separately or advantageously together with the at least one monomer, in particular in the form of an aqueous monomer emulsion. Frequently, the amount of water initially taken in the reaction vessel is $\leq 50$, $\leq 30$, $\leq 20$ or $\leq 10\%$ by weight, based in each case on the total amount of water. The total amount of water is such that the aqueous polymer dispersion obtained has a solids content of from 20 to 70, frequently from 30 to 65, often from 40 to 60, % by weight.

Furthermore, at least one portion of the at least one dispersant is initially taken in the reaction vessel. However, it is also possible initially to take the total amount of the dispersant in the reaction vessel. If only a portion of the dispersant is initially taken, the remaining amount of the dispersant can be added to the reaction medium during the metering phase, separately or advantageously together with the at least one monomer, in particular in the form of an aqueous monomer emulsion. Frequently, the amount of dispersant initially taken in the reaction vessel is $\leq 50$, $\leq 30$, $\leq 20$ or $\leq 10\%$ by weight, based in each case on the total amount of dispersant.

In addition, at least one portion of the at least one oil-soluble free radical initiator is also additionally taken in the reaction vessel. However, it is also possible initially to take the total amount of the oil-soluble free radical initiator in the reaction vessel. If only a portion of the oil-soluble free radical initiator is initially taken, the remaining amount of the oil-soluble free radical initiator can be added separately to the reaction medium during the metering phase. Frequently, the amount of the oil-soluble free radical initiator initially taken in the reaction vessel is $\geq 50$, $\geq 70$, $\geq 80$ or $\geq 90\%$ by weight, based in each case on the total amount of the oil-soluble free radical initiator. Preferably, the total amount of the at least one oil-soluble free radical initiator is initially taken in the reaction vessel.

Optionally, a portion of the at least one monomer can also be initially taken. If this is the case, the amount of the at least one monomer initially taken in the reaction vessel is $\leq 50$, $\leq 30$, $\leq 20$, $\leq 10$ or $\leq 5\%$ by weight, based in each case on the total amount of monomer. Optionally, $\leq 10$ or $\leq 5\%$ by weight, based in each case on the total amount of monomers, of monomers are preferred.

Moreover, a portion of the at least one water-soluble free radical initiator can optionally also be initially taken. If this is the case, the amount of the at least one water-soluble free radical initiator initially taken in the reaction vessel is $\leq 30$, $\leq 20$, $\leq 10$ or $\leq 5\%$ by weight, based in each case on the total amount of the at least one water-soluble free radical initiator. Optionally, $\leq 10$ or $\leq 5\%$ by weight, based in each case on the total amount of water-soluble free radical initiators, of water-soluble free radical initiators are preferred. Frequently, no water-soluble free radical initiator is initially taken in the reaction vessel.

As in all free radical polymerization reactions, it is advantageous if the initial introduction of the reaction components, of the metering/polymerization and the subsequent reaction in the reaction vessel are carried out under an inert gas atmosphere, for example under a nitrogen or argon atmosphere.

If the temperature at which the reaction components are initially taken in the reaction vessel is less than the starting reaction temperature $T_S$, for example room temperature, the reaction mixture is heated to the starting reaction temperature $T_S$ with stirring and under an inert gas atmosphere and, optionally, is left at this temperature for some time. This is advantageous in particular when portions of monomers and water-soluble free radical initiator were initially taken in the reaction vessel. The duration is frequently chosen so that it is at least sufficient for initiating the polymerization reaction, which as a rule is detectable from the liberation of heat of polymerization. The same also applies if the above-mentioned components are initially taken at the starting reaction temperature $T_S$.

Optionally, the remaining amount of demineralized water, optionally, the remaining amount of the at least one oil-soluble free radical initiator, optionally, the remaining amount of the at least one dispersant, the total amount or, optionally, the remaining amount of the at least one monomer and the main amount of the at least one water-soluble free radical initiator are then metered into the reaction mixture present in the reaction vessel, and the reaction mixture is heated to an end reaction temperature $T_E$ during the metering.

After the starting reaction temperature $T_S$ has been reached or after the reaction mixture present in the reaction vessel has been left at this temperature for some time, the total amount or, optionally, the remaining amount of the at least one monomer and the main amount of the at least one water-soluble free radical initiator are metered into the reaction mixture. Advantageously, both metering operations begin simultaneously and take place in such a way that the polymerization reaction of the at least one monomer does not stop.

The metering of the at least one monomer is carried out as a rule in a time span T which, depending on the type and amount of the monomers or the cooling capacity of the reaction vessel, is from 10 minutes to 20 hours, frequently from 0.5 to 5 hours or from 0.75 to 1.5 hours. The total amount or the remaining amount of the at least one monomer can be metered into the reaction vessel continuously, i.e. at a constant flow rate, batchwise, i.e. with a changing flow rate, stepwise, i.e. with interrupted flow or according to any desired predetermined flow rate profile. Of course, it is also possible to change the monomer composition during the metering and thus to obtain the polymer particles which are two-phase, for example core/shell particles, or multiphase. Moreover, it is also possible to meter the monomers into the reaction vessel according to a gradient procedure familiar to a person skilled in the art [i.e. continuous change of the monomer composition].

The metering of the at least one water-soluble free radical initiator is carried out in such a way that the main amount, i.e. $\geq 50$, $\geq 60$, $\geq 70$, $\geq 80$, $\geq 90$, % by weight, based in each case on the total amount of the water-soluble free radical initiator, or even the total amount thereof is added during the monomer metering, advantageously beginning simultaneously with the monomer metering, and thus helps to maintain the polymerization reaction or to complete the reaction of the monomers. Portions of up to $\leq 30\%$ by weight of the water-soluble free radical initiator can be initially taken before the monomer metering and portions of up to $\leq 20\%$ by weight or $\leq 10\%$ by weight of the water-soluble free radical initiator can be added to the polymerization mixture after the end of the monomer metering. The total amount, the main amount or the remaining amount of the at least one water-soluble free radical initiator can be metered into the reaction vessel in principle continuously, batchwise, stepwise or according to any desired predetermined flow rate profile. Frequently, a portion of water-soluble free radical initiator is initially taken before the monomer metering and the resulting remaining amounts are added continuously simultaneously with the monomer metering.

The metering of the monomers and of the water-soluble free radical initiator is frequently effected in such a way that, no later than from the time when 35% by weight of the total amount of monomers have been added to the reaction mixture, the metering of the monomers and of the water-soluble free radical initiator is effected in such a way that the conversion of the monomers already metered into the reaction vessel is $\geq 80\%$ by weight or even $\geq 90\%$ by weight at all times, which can be monitored or realized, for example, on the basis of reaction calorimetry measurements.

Optionally, the remaining amounts of demineralized water, of the at least one oil-soluble free radical initiator or of the at least one dispersant can be metered into the reaction vessel in principle continuously, batchwise, stepwise or according to any desired predetermined flow rate profile. As a rule, the metering of optionally, the remaining amounts of demineralized water, of the at least one oil-soluble free radical initiator or of the at least one dispersant is effected within the time span $\leq T$. If the total amount of the at least one oil-soluble free radical initiator was not initially taken in the reaction vessel, the metering of the residual amount thereof is advantageously effected within the time span within which $\leq 50$, $\leq 40$, $\leq 30$, $\leq 20$ or $\leq 10\%$ by weight of the total amount of monomers were metered into the reaction mixture.

The heating process from $T_S$ to $T_E$ can in principle be started before, after or simultaneously with the beginning of the monomer metering. Frequently, the heating process is started simultaneously with the beginning of the monomer metering. Advantageously, the heating process is carried out within the time span $\leq T$. The heating process can be carried out continuously, i.e. at constant heating rate, batchwise, i.e. with changing heating rate, stepwise, i.e. with interrupted heating rates [=phases of constant temperature] or according to any desired predetermined heating profile. It is advantageous if the heating of the reaction mixture is carried out by means of the polymerization energy liberated in the polymerization reaction of the at least one monomer. Conventional heating rates are $\geq 1$, $\geq 5$, $\geq 10$, $\geq 20$, $\geq 30$ or $\geq 60°$ C./hour but also $\leq 100$, $\leq 70$, $\leq 50$, $\leq 40$, $\leq 30$ or $\leq 20°$ C./hour and all values in between.

The process for heating the reaction mixture is particularly advantageously carried out in such a way that the temperature $T_E$ is reached no earlier than at a time after which at least the main amount of the monomers, i.e. $\geq 50$, $\geq 60$, $\geq 70$, $\geq 80$, $\geq 90$ or even $\geq 100\%$ by weight of the total amount of monomer have been metered into the reaction mixture.

The starting reaction temperature $T_S$ is frequently from $\geq 30$ to $\leq 120°$ C. and often from $\geq 50$ to $\leq 110°$ C. and from $\geq 70$ to $\leq 100°$ C., while the end reaction temperature $T_E$ is frequently from $\geq 80$ to $\leq \geq 200°$ C. and often from $\geq 100$ to $\leq 170°$ C. and from $\geq 110$ to $\leq 50°$ C. It is advantageous if the end reaction temperature $T_E$ is $\geq T_S+10°$ C., $\geq T_S+20°$ C. or $\geq T_S+30°$ C.

It is important that the novel process can optionally also be carried out in the presence of at least one reducing agent, which however is added to the reaction mixture no earlier than after at least 50 or at least 60 or at least 70% by weight of the total amount of monomers have been metered into the reaction mixture. The total amount of optionally metered reducing agent is from 0.01 to 5, frequently from 0.5 to 3, often from 1 to 2, % by weight, based in each case on the total amount of monomers. The metering of the reducing agent optionally added can be carried out continuously, batchwise, stepwise or according to any desired predetermined flow rate profile. Sulfur compounds having a low oxidation state, such as alkali metal sulfites, for example potassium and/or sodium sulfite, alkali metal hydrogen sulfites, for example potassium and/or sodium hydrogen sulfite, alkali metal bisulfites, for example potassium and/or sodium metabisulfite, formaldehyde sulfoxylates, for example potassium and/or sodium formaldehyde sulfoxylate, alkali metal salts, especially potassium and/or sodium salts of aliphatic sulfinic acids, and alkali metal hydrogen sulfides, for example potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone, can be used as corresponding reducing agents.

The novel free radical aqueous emulsion polymerization can be carried out in principle at a pressure which is less than, equal to or greater than 1 bar (absolute). It is advantageous if the pressure conditions during the initial introduction and during the metering/polymerization are chosen so that the reaction mixture does not begin to boil at any time during the novel process. The pressure may be 1.2, 1.5, 2, 5, 10 or 15 bar or may assume even higher values. Advantageously, the free radical aqueous emulsion polymerization is carried out at $\geq 1$ bar (absolute) and under an inert gas atmosphere.

In addition, for achieving high monomer conversions or low residual monomer contents, it is advantageous if the reaction mixture is kept at the end reaction temperature $T_E$ after the end of the monomer metering for at least a further 30 minutes with stirring. Depending on the reactivity of the monomers used for the polymerization, the subsequent reaction time is frequently $\geq 30$ minutes and $\leq 5$ hours or $\geq 45$ minutes and $\leq 3$ hours or $\geq 1$ hour and $\leq 2$ hours.

The novel process can of course also be carried out in the presence of further conventional assistants, for example free radical chain transfer compounds, polymer seed, antifoams, viscosity regulators, biocides, etc. Depending on their function, these assistants can be added to the initially taken mixture (for example polymer seed, antifoam), during the metering (for example free radical chain transfer compounds, polymer seed) or after the end of the polymerization (for example biocides).

Free radical chain transfer compounds are usually used for reducing or controlling the molecular weight of the polymer obtainable by free radical aqueous emulsion polymerization. Substantially aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride or benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols, such as benzenethiol, ortho-, meta- or para-methylbenzenethiol, and all further sulfur compounds described in Polymer Handbook 3$^{rd}$ edition, 1989, J. Brandrup and E. H. Immergut, John Wiley & Sons, Section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having easily abstractable hydrogen atoms, for example toluene, are used. However, it is also possible to use mixtures of the abovementioned free radical chain transfer compounds which do not interfere.

The total amount of free radical chain transfer compounds optionally used in the novel process is as a rule $\leq 5$, often $\leq 3$, frequently $\leq 1$, % by weight, based on the total amount of the monomers to be polymerized.

In addition to the seed-free preparation method, the novel emulsion polymerization can be carried out by the polymer seed process or in the presence of an aqueous polymer seed dispersion prepared in situ, for establishing the polymer particle size. Processes for this purpose are known and are described in the prior art (cf. for example EP-B 40 419, EP-A 567 812, EP-A 614 922 and Encyclopedia of Polymer Science and Technology, Vol. 5, page 847, John Wiley & Sons Inc., New York, 1966). Thus, in the feed process, the prior art recommends initially taking a defined finely divided polymer seed dispersion in the polymerization vessel and then polymerizing the at least one monomer in the presence of the seed latex. Here, the seed polymer particles act as polymerization nuclei and decouple the polymer particle formation and the polymer particle growth. During the emulsion polymerization, further aqueous polymer seed dispersion can be added to the reaction mixture. This results in broad size distributions of the polymer particles, which are often desired in particular in the case of polymer dispersions having a high solids content (cf. in this context, for example, DE-A 4213965). Instead of the addition of a defined seed latex, the latter can also be produced in situ. For this purpose, for example, a portion of the at least one monomer and of the water-soluble free radical initiator is initially taken together with a portion or the total amount of the dispersant and heated to the starting reaction temperature $T_S$, a relatively finely divided seed forming. The actual polymerization is then carried out in the same polymerization vessel by the metering process described (cf. also DE-A 4213965).

What is of importance is the fact that the novel process can also optionally be carried out in the presence of dissolved heavy metal ions which may be present with various valencies, for example iron, manganese, copper, chromium or vanadium ions. Frequently, complexing agents, for example ethylenediaminetetraacetic acid (EDTA) or nitrilotriacetic acid (NTA), are also added and form complexes with the heavy metal ions and keep them in solution under the reaction conditions. Usually, the aqueous polymer dispersions obtained according to the invention have a content of dissolved heavy meal ions of $\leq 1,000$ parts per million (ppm), often $\leq 500$ ppm, frequently $\leq 100$ ppm.

The polymers obtainable by the novel process may have glass transition temperatures of from $-70$ to $+150°$ C. Depending on the intended use, polymers whose glass transition temperatures are within certain ranges are frequently required. By a suitable choice of the ethylenically unsaturated monomers to be polymerized, it is possible for a person skilled in the art to prepare in a targeted manner polymers whose glass transition temperatures are in the desired range. If, for example, it is intended to use the polymers obtainable by the novel process as contact adhesives, the composition of the monomer mixture to be polymerized is chosen so that the polymers produced have glass transition temperatures of $<0°$ C., frequently $\leq -5°$ C., often $\leq -10°$ C. If, on the other hand, it is intended to use the polymers, for example, as binders in coating formulations, the composition of the monomer mixture to be polymerized is chosen so that the polymers produced have glass transition temperatures of from $-40$ to $+150°$ C., frequently from $0$ to $+100°$ C., often from $+20$ to $+80°$ C. The same also applies to the polymers which are to be used in other applications.

The glass transition temperature $T_g$ is understood as meaning the limiting value of the glass transition temperature, to which limiting value said glass transition temperature tends with increasing molecular weight according to G. Kanig (Kolloid-Zeitschrift & Zeitschrift fur Polymere, Vol. 190, page 1, equation 1). The glass transition temperature is determined by the DSC method (differential scanning calorimetry, 20 K/min, midpoint measurement, DIN 53 765).

According to Fox (T. G. Fox, Bull. Am. Phys. Soc. 1956 [Ser. II] 1, 123 and according to Ullmann's Encyclopäedie der technischen Chemie, Vol. 19, page 18, 4th edition, Verlag Chemie, Weinheim, 1980), a good approximation of the glass transition temperature of at most weakly crosslinked copolymers is:

$$1/T_g = x^1 1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, T_g^n$ are the glass transition temperatures, in degrees Kelvin, of the polymers composed in each case only of one of the monomers 1, 2, ... n. The $T_g$ values for the homopolymers of most monomers are known and are mentioned, for example, in Ullmann's Encyclopedia of Industrial Chemistry, Part 5, Vol. A21, page 169, VCH Weinheim, 1992; further sources of glass transition temperatures of homopolymers are, for example, J. Brandrup, E. H. Immergut, Polymer Handbook, 1$^{st}$ Ed., J. Wiley, New York 1966, 2$^{nd}$ Ed. J. Wiley, New York 1975, and 3$^{rd}$ Ed. J. Wiley, New York 1989.

The polymer particles of the polymer dispersions obtainable by the novel process have number average particle diameters which as a rule are from 10 to 1 000 nm, frequently from 50 to 700 nm, often from 100 to 500 nm [determined, for example, by quasielastic light scattering (ISO standard 13 321)].

What is essential to the process is that the aqueous polymer dispersions obtainable by the novel process can be stripped with inert gas and/or steam after the end of the monomer metering or advantageously after the end of the subsequent reaction time for removing any troublesome readily volatile components without a further heating process. The corresponding stripping processes are familiar to a person skilled in the art and are described, for example, in DE-A 2550023, DE-C 2759097, DE-C 2855146 or DE-C 2521780.

After cooling to room temperature, the aqueous polymer dispersions obtainable by the novel process can advantageously be used either directly or after corresponding stripping with inert gas and/or steam, for example as binders in adhesives, sealing compounds, plastics renders and surface coating materials and for modifying mineral binders. Furthermore, the corresponding polymer powders, which are likewise suitable as binders in adhesives, sealing compounds, plastics renders and surface coating materials and for modifying mineral binders, are obtainable in a simple manner (for example freeze-drying or spray-drying) from the novel aqueous polymer dispersions.

Aqueous polymer dispersions which are virtually free of monomers or other volatile components and thus have little odor and low emissions are obtainable by the novel process—in particular after stripping with inert gas and/or steam. The aqueous polymer dispersions obtainable according to the invention are therefore advantageously suitable for the preparation of solvent-free coating materials having low emissions, for example plastics dispersion renders, coating materials and in particular emulsion paints having low emissions and sealing compounds and adhesives. The process is distinguished in particular by the fact that low residual monomer contents are obtained even without an additional chemical aftertreatment step which as a rule contaminates the aqueous polymer dispersions with additional secondary components. A corresponding aftertreatment reactor is thus no longer required. Furthermore, the fact that the polymerization times can be reduced and hence the polymer capacities increased by the monomer conversion rates optimized according to the invention is important.

The nonrestricting example which follows illustrates the invention.

EXAMPLE

In a 6 l polymerization reactor having an MIG stirrer and heating/cooling means,

| | |
|---|---|
| 500 g | of demineralized water |
| 1.0 g | of a 5% strength by weight aqueous solution of an EDTA Fe/Na salt (DISSOLVINE ® E-FE-6, brand of Akzo Nobel) |
| 4.0 g | of a 28% strength by weight aqueous solution of the sulfuric monoester of an ethoxylated $C_{12}$-fatty alcohol (TEXAPON ® NSO IS, brand of Akzo Nobel) |
| 112 g | of an aqueous polymer latex (prepared by free radical emulsion polymerization of styrene; polymer solids content 33% by weight) having a weight average particle diameter of 30 nm |
| 185 g | of a 5% strength by weight aqueous solution of itaconic acid |
| 14 g | of tert-butyl peroxybenzoate (TRIGONOX ® C, brand of Akzo Nobel) | and 5% by weight of the feed I described below were initially taken at from 20 to 25° C. (room temperature) and heated to 95° C. with stirring (90 rpm) and under a nitrogen atmosphere. On reaching 95° C., the remaining amount of feed I and the total amounts of feeds II and III were metered in with constant feed streams in the course of 90 minutes, with stirring and beginning simultaneously, the reaction temperature being caused to increase to 120° C. by the liberated heat of polymerization, which was reached after about 60 minutes. During the polymerization reaction, the pressure in the gas phase of the polymerization reactor was not more than 9 bar (gage pressure). Feeds I and II were fed to the polymerization reactor at the bottom via a common feed pipe.

Feed I is an aqueous emulsion prepared from:

| | |
|---|---|
| 600 g | of demineralized water |
| 50 g | of a 10% strength by weight aqueous solution of sodium hydroxide |
| 30 g | of a 28% strength by weight aqueous solution of TEXAPON ® NSO IS |
| 80 g | of acrylic acid 20 g of tert-dodecyl mercaptan |
| 1000 g | of styrene |

Feed II:

| | |
|---|---|
| 750 g | of butadiene |

Feed III:

| | |
|---|---|
| 280 g | of a 12% strength by weight aqueous solution of sodium peroxydisulfate. |

After the ends of feeds I to II, the polymerization mixture was stirred for a further two hours at 120° C. under a nitrogen atmosphere. Thereafter, the polymerization mixture was cooled to 60° C. and let down to atmospheric pressure. For removing unconverted butadiene, the polymerization reactor was evacuated to 800 mbar (absolute) and left for one hour with stirring at this pressure and at 60° C. Thereafter, the aqueous polymer dispersion obtained was cooled to room temperature and the internal pressure of the reactor was allowed to increase to atmospheric pressure.

The aqueous polymer dispersion obtained had a polymer solids content of 52% by weight. The mean polymer particle diameter was 125 mm. The aqueous polymer dispersion had a residual monomer content of 1 570 ppm of styrene and 840 ppm of acrylic acid.

The solids contents were generally determined by drying an aliquot amount of the aqueous polymer dispersion at 140° C. in a drying oven to constant weight. In each case two separate measurements were carried out. The value stated in the respective examples is the mean value of the two measured results.

The resulting residual amounts of styrene were generally determined by gas chromatography, and the residual amounts of acrylic acid by means of HPLC.

The mean particle diameter of the copolymer particles was determined generally by dynamic light scattering on a 0.005 to 0.01 percent strength by weight aqueous dispersion at 23° C. by means of an Autosizer IIC from Malvern Instruments, England. The cumulant z-average of the measured autocorrelation function is stated (ISO standard 13321).

Comparative Example

In a 6 l polymerization reactor having an MIG stirrer and heating/cooling means,

| | |
|---|---|
| 500 g | of demineralized water |
| 1.0 g | of a 5% strength by weight aqueous solution of DISSOLVINE ® E-FE-6 |
| 4.0 g | of a 28% strength by weight aqueous solution of TEXAPON ® NSO IS |
| 112 g | of an aqueous polymer latex (prepared by free radical emulsion polymerization of styrene; polymer solids content 33% by weight) having a weight average particle diameter of 30 nm |
| 185 g | of a 5% strength by weight aqueous solution of itaconic acid |
| 42 g | of tert-butyl peroxybenzoate (TRIGONOX ® C) | and 5% by weight of the feed I described below were initially taken at room temperature and heated to 95° C. with stirring (90 rpm) and under a nitrogen atmosphere. On reaching 95° C., the remaining amount of feed 1 and the total amounts of feeds II and III were metered in with constant feed streams in the course of 90 minutes with stirring and beginning at the same time, the reaction temperature being caused to increase to 120° C. by the liberated heat of polymerization, which was reached after about 50 minutes. During the polymerization reaction, the pressure in the gas phase of the polymerization reactor was not more than 12 bar (gage pressure). Feeds I and II were fed to the polymerization reactor at the bottom via a common feed pipe.

Feed I is an aqueous emulsion prepared from:

| | |
|---|---|
| 600 g | of demineralized water |
| 50 g | of a 10% strength by weight aqueous solution of sodium hydroxide |
| 30 g | of a 28% strength by weight aqueous solution of TEXAPON ® NSO IS |
| 80 g | of acrylic acid |
| 20 g | of tert-dodecyl mercaptan |
| 1000 g | of styrene |

Feed II:

| | |
|---|---|
| 750 g | of butadiene |

Feed III:

| | |
|---|---|
| 220 g | of a 15% strength by weight aqueous solution of sodium formaldehyde sulfoxylate. |

After the end of feeds I to III, the polymerization mixture was stirred for a further 2 hours at 120° C. under a nitrogen atmosphere. Thereafter, the polymerization mixture was cooled to 60° C. and let down to atmospheric pressure. For removing unconverted butadiene, the polymerization reactor was evacuated to 800 mbar (absolute) and left for one hour with stirring at this pressure and at 60° C. Thereafter, the aqueous polymer dispersion obtained was cooled to room temperature and the internal pressure of the reactor was allowed to increase to atmospheric pressure.

The aqueous polymer dispersion obtained had a polymer solids content of 50% by weight. The mean polymer particle size was 130 nm. The aqueous polymer dispersion had a residual monomer content of 3,550 ppm of styrene and 1,910 ppm of acrylic acid.

We claim:

1. A process for the preparation of an aqueous polymer dispersion by free radical aqueous emulsion polymerization comprising polymerizing at least one ethylenically unsaturated compound (monomer) in the presence of at least one dispersant, wherein
    a) into a reaction vessel at a temperature which is less than or equal to the starting reaction temperature $T_S$,
        $a_1$) at least one portion of demineralized water,
        $a_2$) at least one portion of at least one oil-soluble free radical initiator,
        $a_3$) at least one portion of at least one dispersant,
        $a_4$) optionally, a portion of the at least one monomer and
        $a_5$) optionally, a portion of at least one water-soluble free radical initiator are initially added to form a reaction mixture in the reaction vessel, thereafter
    b) the reaction mixture obtained is, optionally, heated to the starting reaction temperature $T_S$, and thereafter
    c) the following are metered into the reaction mixture:
        $c_1$) optionally, the remaining amount of demineralized water,
        $c_2$) optionally, the remaining amount of the at least one oil-soluble free radical initiator,
        $c_3$) optionally, the remaining amount of the at least one dispersant,
        $c_4$) the total amount or, optionally, the remaining amount of the at least one monomer and
        $c_5$) the main amount of the at least one water-soluble free radical initiator, and
    d) the reaction mixture is heated to an end reaction temperature $T_E$ during the metering of the at least one monomer, and wherein
        the at least one water-soluble free radical initiator has a solubility of $\leq 1\%$ by weight at 20° C. and atmospheric pressure in demineralized water, and the at least one oil-soluble free radical initiator has a solubility of $<1\%$ by weight under the process conditions and the total amount of water being such that the aqueous polymer dispersion obtained has a solids content of from 20 to 70% by weight,
        the at least one water-soluble free radical initiator initiates a free radical polymerization reaction of the at least one monomer at the starting reaction temperature $T_S$, and
        at least one oil-soluble free radical initiator has a half-life of $\geq 10$ hours at the starting reaction temperature $T_S$ and a half-life of $\leq 5$ hours at the end reaction temperature $T_E$.

2. The process according to claim 1, wherein $T_E \geq T_S + 10°$ C.

3. The process according to claim 1, wherein $T_S$ is from $\geq 30$ to $\leq 120°$ C. and $T_E$ is from $\geq 80$ to $\leq 200°$ C.

4. The process according to claim 1, wherein the amount of water-soluble and oil-soluble free radical initiator is in each case from 0.01 to 5% by weight, based on the total amount of monomer.

5. The process according to claim 1, wherein the pressure during the polymerization is chosen so that the reaction mixture does not boil at any time.

6. The process according to claim 1, wherein the at least one water-soluble free radical initiator used is a mono- or di-alkali metal or ammonium salt of peroxodisulfuric acid.

7. The process according to claim 1, wherein the at least one oil-soluble free radical initiator used is at least one compound selected from the group consisting of tert-butyl peroxy-2-ethylhexanoate, tert-amyl peroxy-2-ethylhexanoate, tert-butyl peroxybenzoate, tert-amyl peroxybenzoate, tert-butyl peroxyacetate, tert-butyl peroxy-3,5,5-trimethylhexanoate, tert-butyl peroxyisobutanoate, tert-butyl peroxydiethylacetate, tert-butyl peroxypivalate, tert-butyl peroxyisopropylcarbonate, and tert-butyl peroxy-2-ethylhexylcarbonate.

8. The process according to claim 1, wherein the reaction mixture is kept at the end reaction temperature $T_E$ for at least a further 30 minutes after the end of the monomer metering.

9. The process according to claim 1, wherein the reaction mixture is stripped with inert gas and/or steam after the end of the monomer metering.

10. The process according to claim 1, wherein the dispersant is a protective colloid or an emulsifier.

11. The process according to claim 1, wherein the total amount of the dispersant is from 0.1 to 5 wt. % based on the total amount of the monomer to be subjected to the free radical polymerization.

12. The process according to claim 1, wherein an amount of water in $a_1$) is equal or less than 50 wt. % based on the total amount of water.

13. The process according to claim 1, wherein an amount of the dispersant in $a_3$) is equal or less than 50 wt. % based on the total amount of the dispersant.

14. The process according to claim 1, wherein the monomer is added in $a_4$) and an amount of the monomer is equal or less than 50 wt. % based on the total amount of monomer.

15. The process according to claim 1, wherein the water-soluble free radical initiator is added in $a_5$) and an amount of the at least one water-soluble free radical initiator is equal or less than 30 wt. % based on the total amount of the water-soluble free radical initiator.

16. The process according to claim 1, wherein an amount of the oil-soluble free radical initiator in $a_2$) is at least 50 wt. % based on the total amount of the oil-soluble free radical initiator.

17. The process according to claim 1, wherein the metering of the at least one monomer is carried out from 10 minutes to 20 hours.

18. The process according to claim 1, wherein the metering of the at least one water-soluble free radical initiator is carried out in such a way that at least 50 wt. % of the water-soluble free radical initiator is added during the monomer metering.

* * * * *